Feb. 13, 1968  L. S. TUISKU  3,369,071

ELECTRICAL CONDUIT CONNECTOR

Filed Oct. 15, 1965

INVENTOR
*LAURI S. TUISKU*

BY *Oberlin, Maky & Donnelly*
ATTORNEYS

United States Patent Office 3,369,071
Patented Feb. 13, 1968

3,369,071
ELECTRICAL CONDUIT CONNECTOR
Lauri S. Tuisku, 1669 Columbia Road,
Westlake, Ohio 44091
Filed Oct. 15, 1965, Ser. No. 496,317
10 Claims. (Cl. 174—65)

ABSTRACT OF THE DISCLOSURE

A connector including a tubular sleeve having a circumferentially extending projection adjacent one end which one end is inserted through an opening in a junction box or the like and held in place by prying out a deformable tongue axially inwardly spaced from the projection and disposed at an angle with respect thereto, the free end of the tongue being axially inwardly spaced from said projection by a distance slightly greater than the thickness of the wall of the opening, and the base of the tongue being axially inwardly spaced from the projection by a distance somewhat less than the wall thickness.

---

The present invention relates generally, as indicated, to an electrical conduit connector and, more particularly, to a novel connector and joint and method for quickly and easily joining a wire conduit to a junction or outlet box of conventional type without the need of any special tools.

When installing the electrical wiring for the light and power circuits in a building such as a home, apartment, or office building, for example, it is the usual practice to provide junction or outlet boxes in the ceilings and walls wherever an electrical outlet and switch therefor is desired, and to run electrical wire between such junction boxes and the main power lines, with metal conduits surrounding the wire to protect it.

There are many different types of connectors now being used for attaching conduits to junction boxes, but they have not proven to be entirely satisfactory, either because of their high cost or the amount of time and in some cases special tools which are required to install them.

It is therefore a principal object of this invention to provide a novel connector which is relatively inexpensive to manufacture, simple in construction, and can be installed quickly and easily to form a novel joint in a new and novel manner.

Another object is to provide such a connector with novel means for locking the connector to the junction box, including a rib or projection and a deformable tongue axially spaced from the rib for engaging opposite sides of the wall of the junction box.

A further object is to provide a connector of the type described wherein the tongue is on a helix or angle with respect to the rib for wedging the wall of the junction box tightly against the rib.

A still further object is to provide biting edges on the connector for securing the connector to the conduit in which the wire is received.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principle of the invention may be employed.

Figure 1:
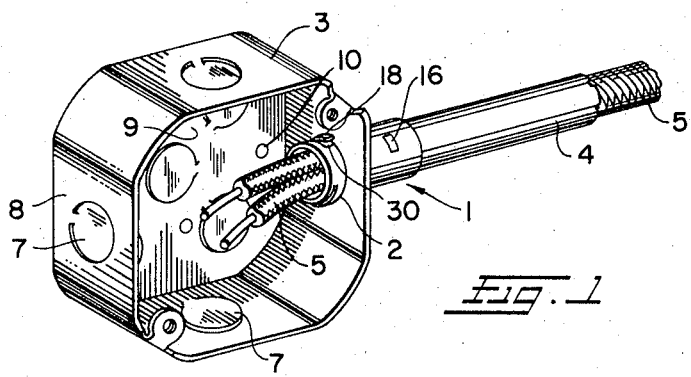
FIG. 1 is an isometric view of a preferred form of electrical conduit connector in accordance with the present invention shown in position in a knockout hole in a junction box with a metal conduit inserted into the connector and the electrical wires extending through the connector and into the interior of the junction box.

Referring now in detail to the drawing, and first of all to FIG. 1, a preferred form of electrical conduit connector in accordance with the present invention is generally indicated at 1, it being shown in the assembled position extending through one of the knockout openings 2 of an outlet or junction box 3 with a metal conduit 4 and a pair of electric wires 5 extending into the outer end 6 of the connector. The box 3 shown is of conventional type, made of heavy steel or similar metal with a plurality of knockouts 7 formed in the sides 8 and back 9 for ready access into the interior of the box 3 from almost any direction, simply by removing the appropriate knockout. The box 3 may be attached to a suitable support wherever there is to be an outlet as by means of fasteners passing through apertures 10 in the back 9, or through apertures in a mounting bracket (not shown) which may form a part of the box 3.

As clearly seen in FIGS. 2–5, the electrical conduit connector 1 preferably comprises a tubular sleeve 15 with one or more biting edges 16 formed therein for locking the sleeve 15 to the conduit 4, and a rib or projection 17 and one or more deformable tongues 18 axially spaced from the rib for firmly gripping one of the walls 8 or 9 of the box 3 therebetween, in a manner which will be fully discussed hereafter. The biting edges 16 may be provided by making a plurality of circumferentially spaced, transverse slits 20 around the periphery of the sleeve 15, the number of slits of course depending upon the number of biting edges desired, and deforming the edges of the slits slightly radially inwardly to the concave configuration shown in FIG. 5. These biting edges 16, although they extend only a few hundreths of an inch into the interior of the sleeve 15, are very effective in gripping the conduit 4 when the conduit is shoved past the biting edges and then turned as with a pliers, since the connector 1 is made of a metal such as hardened steel which is somewhat harder than the metal of the conduit, it usually being thin walled cold rolled galvanized steel. This relative rotation between the connector 1 and conduit 4 causes the biting edges 16 to cut into the conduit 4 and form stop shoulders 21 which are continuously contacted by the biting edges 16. One, two three, or more of such biting edges 16 may be used, depending on the size of the conduit 4 and connector 1 and the strength of connection desired therebetween.

For limiting the extent to which the conduit 4 may be inserted into the connector 1, a plurality of circumferentially spaced dimples 23 may be provided adjacent the rib 17. Thus, when the inner end of the conduit 4 engages the dimples 23 and the conduit 4 cannot be forced any further into the sleeve, the person who is making the assembly will immediateily know that the conduit has been pushed beyond the biting edges 16 a distance sufficient to permit forming of the top shoulders 21 therein in the manner previously discussed.

Figure 2:
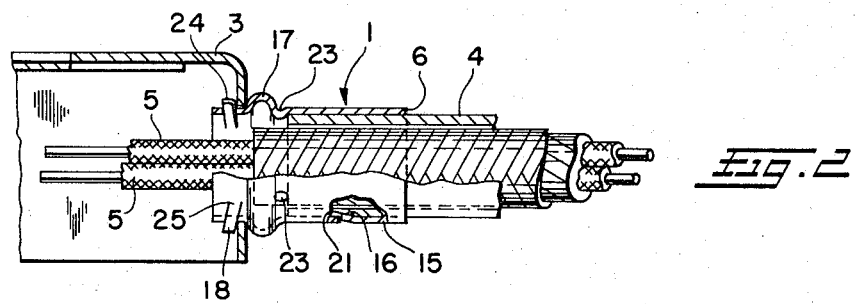
FIG. 2 is a partial longitudinal section of the connector, junction box, and conduit of FIG. 1.
Figures 3, 4, 5:
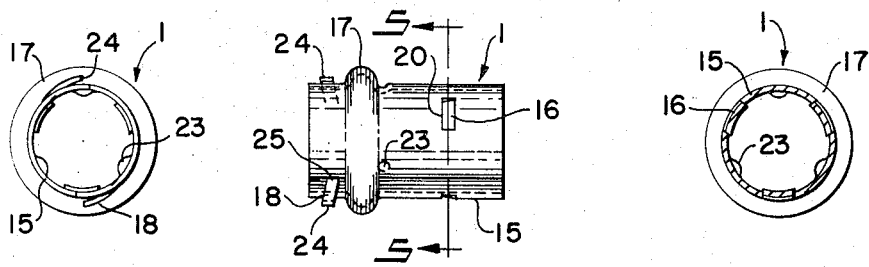
FIG. 3 is a side elevation of such connector.
FIG. 4 is an end elevation of such connector as viewed from the left end of FIG. 3.
FIG. 5 is a vertical section of such connector taken on the plane of the line 5—5 of FIG. 3.

As perhaps best seen in FIGS. 2 and 3, the tongues 18 are disposed on a helix or angle with respect to the rib 17 with the free ends 24 of the tongues 18 spaced from the rib 17 by a distance slightly greated than the wall thickness of the box 3, and the base 25 of such tongues being spaced slight less than such thickness. Accordingly, with the sleeve 15 inserted through the knockout opening 2 in the wall 8 of the box 3 and the rib 17 engaging the outer surface of such wall, the wall 8 can be wedged tightly between the rib 17 and tongues 18 simply by prying the tongues radially outwardly to the extent desired.

For removing the connector 1 from the box 3, it is only necessary to deform the tongues 18 radially inwardly into the slots 30 (see FIG. 1) in the sleeve 15 which were formed as a result of the punching of the tongues from the sleeve 15. When the tongues are in this position, the connector 1 may be readily pulled from or inserted into one of the knockout openings 2.

Figure 6:
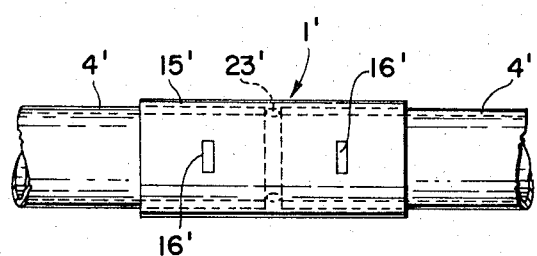
FIG. 6 is a side elevation of another form of such electrical conduit connector especially suited for interconnecting two conduits together.

Referring next to FIG. 6, there is shown another form of connector 1' for connecting two of such conduits 4' together. The connector 1', like the connector 1, is in the form of a tubular sleeve 15', but has two sets of circumferentially spaced biting edges 16' axially spaced from each other, rather than just one, and a plurality of circumferentially spaced dimples 23' therebetween which form stops for the ends of the conduits 4'. Thus, each of the conduits 4' is locked to the connector 1' by inserting the conduits 4' into the connector 1' from opposite ends until they engage the dimples 23', and then turning the connector 1' while holding the conduits 4' stationary or turning the conduits 4' while holding the connector stationary to cause the biting edges 16' to cut into the conduits so as to form the stop shoulders 21', as in the FIGS. 1–5 embodiment.

From the above discussion, it is now apparent that the connectors 1 and 1' of the present invention are quite simple in construction, and yet are very effective for quickly and easily attaching a conduit to a junction or outlet box, or connecting a pair of such conduits together. In the first form, the deformable tongues in conjunction with the adjacent rib are capable of securely gripping a wide range of wall thicknesses simply by prying the tongues radially outwardly to the extent necessary to wedge the wall up against the adjacent rib. Moreover, the relatively shallow biting edges 16 permit easy insertion of the conduit into the connector, but once the connector is rotated to cause the biting edges to cut into the outer surface of the conduit, it is extremely difficult to remove the conduit therefrom.

Other modes of applying the principles of the invention may be employed, change being made as regards the details described, provided the features stated in any of the following claims or the equivalent of such be employed.

I therefore, particularly point out and distinctly claim as my invention:

1. A connector comprising a tubular sleeve having an outer end for receipt of a conduit, and an inner end for insertion into an opening in the wall of a junction box and the like, a circumferentially extending projection on the outer periphery of said sleeve adjacent said inner end, and a deformable tongue extending from said sleeve axially inwardly spaced from said projection, said deformable tongue being disposed at an angle with respect to said projection such that the axial distance between the free end of said projection is greater than the axial distance between the base of said tongue and said projection, whereby when the inner end of said sleeve is inserted through such opening with said projection engaging the outer surface of the wall thereof, the prying of said tongue radially outwardly adjacent the inner surface of such wall will cause the wall to be wedged tightly between said tongue and projection.

2. The connector of claim 1 further comprising a plurality of circumferentially spaced biting edges extending radially inwardly from said sleeve axially outwardly spaced from said projection and tongue for precluding withdrawal of the conduit.

3. The connector of claim 2 further comprising stop means on the inner surface of said sleeve between said projection and biting edges for limiting the extent to which the conduit may be inserted into said connector.

4. The connector of claim 3 wherein said stop means comprises a plurality of circumferentially spaced dimples on the inner surface of said sleeve.

5. The connector of claim 1 wherein there are a plurality of said tongues circumferentially spaced about the periphery of said sleeve, each tongue having parallel sides disposed at an angle with respect to the projection as aforesaid.

6. The connector of claim 1 wherein said circumferentially extending projection comprises an annular rib formed in the wall of said sleeve.

7. An electrical conduit connector assembly comprising a junction box having a wall with an opening therein, a connector having an inner end extending through said opening, said connector being in the form of a sleeve with a circumferentially extending projection on the outer periphery thereof adjacent said inner end, said projection being in engagement with the outer surface of said wall adjacent said opening, and a deformable tongue extending from said sleeve inwardly of said projection and at an angle with respect to said projection, the free end of said tongue being axially inwardly spaced from said projection by a distance slightly greater than the thickness of said wall, and the base of said tongue being axially inwardly spaced from said projection by a distance slightly less than said wall thickness, said wall being wedged tightly between said tongue and projection due to the prying of said tongue radially outwardly.

8. The assembly of claim 7 further comprising a conduit extending into the outer end of said connector, said connector having a plurality of circumferentially spaced biting edges extending radially inwardly from said sleeve into biting engagement with the outer surface of said conduit firmly to grip the same.

9. The assembly of claim 8 further comprising a plurality of circumferentially spaced dimples on the inner surface of said sleeve between said projection and biting edges for limiting the extent to which said conduit may be inserted into said connector.

10. The assembly of claim 9 wherein said circumferentially extending projection comprises an annular rib formed in the wall of said sleeve.

References Cited

UNITED STATES PATENTS

| | | | |
|---|---|---|---|
| 1,830,250 | 11/1931 | Tiefenbacher | 285—162 |
| 2,128,040 | 8/1938 | Conners | 285—192 X |
| 2,291,434 | 7/1942 | Hollopeter et al. | 174—90 |
| 3,276,014 | 9/1966 | Rueger | 174—153 |

LARAMIE E. ASKIN, *Primary Examiner.*

D. A. TONE, *Assistant Examiner.*